United States Patent [19]

Atencio

[11] 4,073,146
[45] Feb. 14, 1978

[54] SUBMERSIBLE DIFFUSER

[76] Inventor: Francisco José Gutiefrez Atencio, Díamante 3105, Entre Rios, Argentina

[21] Appl. No.: 703,569

[22] Filed: July 8, 1976

[30] Foreign Application Priority Data

July 14, 1975 Argentina ............................. 259566

[51] Int. Cl.² ............................................ E02B 9/00
[52] U.S. Cl. ...................................... 61/19; 61/69 A; 61/87; 290/53; 415/145; 417/234
[58] Field of Search ................... 61/19, 20, 63, 50, 87, 61/43, 69 A; 417/234; 415/145; 290/53, 42; 138/37, 41, 39

[56] References Cited

U.S. PATENT DOCUMENTS 1,199,207 9/1916 Ryons et al. ......................... 415/145
1,467,168 9/1923 Kaplan ................................. 61/19 X

FOREIGN PATENT DOCUMENTS 1,123,466 6/1956 France ............................... 417/234
357,983 1/1906 France ................................ 61/43

Primary Examiner—Jacob Shapiro
Attorney, Agent, or Firm—Emory L. Groff, Jr.

[57] ABSTRACT

Submersible diffuser for a hydroelectric power plant includes chambers defined in its lateral wall and which can be filled with water to sink the diffuser or with gas to float it; additionally, the diffuser has lateral rollers. The hydroelectric power plant is provided with guide surfaces positioned adjacent the water outlet thereof for receiving the rollers of the diffuser and enabling positioning of the diffuser at the water outlet. Also included is the method of submerging and positioning the diffuser at the water outlet of the power plant.

7 Claims, 5 Drawing Figures

D-D 4,073,146

SUBMERSIBLE DIFFUSER

BACKGROUND OF THE INVENTION

The present invention relates to diffusers for hydro-power plants and more particularly to a submersible diffuser and to a hydro-power or hydroenergy producing plant adapted to receive it.

Diffusers for hydro-energy producing plants such as hydroelectric or hydro pumped-storage plants are, obviously, well known in the art.

the aim of such diffusers, positioned at the water outlet of the turbines, is to convert the inherent energy due to the speed of the water into energy due to pressure thereof. These diffusers are particularly important in low-head hydrogeneration plants.

It is known that in a rectilinear frusto conical diffuser, the highest efficiency is attained when the angle at the vertex of the cone is 6°. If this angle is decreased, friction between the water flowing through the diffuser and the inner surface thereof increases, thus reducing the efficiency of the diffuser.

Similarly, if this angle is increased, then losses are caused due to turbulence and back flow of the water.

It is also known, that the ideal ratio between the diameter of the inlet end of the diffuser and the length thereof, should not be less than 1/10. For water heads of 10 m., this ideal ratio must be around 1/15 for best efficiency.

These parameters, which only take into account hydraulic efficiency considerations, have never been put into practice because a diffuser built with such dimensions would be non economical. Consequently smaller, less efficient diffusers are generally used, although they are still large and costly structures, particularly when they have been designed to be reasonably efficient.

It is an aim of the present invention to enable the construction of optimum diffusers by providing means for manipulating, positioning and mounting such diffusers, with relative ease, in spite of their bulky sizes.

An additional aim of the present invention has been to provide a novel diffuser whereby it is possible to increase the efficiency of a known hydroelectric power plant by easily improving the known diffuser, by one according to the present invention.

This increased efficiency is not a direct consequence of the novel structure of the diffuser, but such novel structure now makes it possible to use a diffuser designed to provide optimum efficiency, and which so far was not manufactured because of its bulky size and expensive construction costs.

An even further aim of the present invention has been to provide a novel structure whereby hydrostructures built for other purposes, such as: flood control systems, navigation development, irrigation intakes, abandoned dikes etc.; can be easily converted into power generating plants.

A further aim of the present invention has been to provide a new method of positioning a diffuser in an energy generating plant such a hydraulic power plant.

According to one aspect of the present invention there is provided a submersible diffuser for an energy producing plant having means for directing water through an energy generating unit for causing actuation thereof, the diffuser comprising a hollow body defined by a lateral or peripheral wall and having a first open end adapted to be positioned against the outlet of said water directing means for receiving the water emerging therefrom, and a second open end for discharging the water entering the first end; the opening of said first end being of smaller cross sectional area than the opening of said second end; at least one chamber defined in said wall and of a volume at least sufficient to cause sinking or floatation of said diffuser when the former is filled with water or gas, respectively; and means for filling the chamber with water for sinking purposes and with gas for floatation purposes.

According to another aspect of the present invention a hydroelectric power plant having means for directing water through a power generating unit for causing actuation thereof, is improved by incorporating therein a diffuser having a hollow body defined by a lateral wall, and having a first open end positioned against the outlet of said water directing means for receiving the water emerging therefrom, and a second open end for discharging the water entering the first end; the opening of said first end being of smaller cross sectional area than the opening of said second end; at least one chamber defined in said wall and having a volume at least sufficient to cause sinking or floating of said diffuser when the former is filled with water or gas respectively; means for filling the chamber with water for sinking purposes and with gas for floatation purposes; and means for movably supporting said diffuser downstream of said power plant and permitting the diffuser to be moved towards and away from said power plant during mounting or dismounting of said diffuser in said power plant.

According to an even further aspect of the present invention, a method is provided for submerging and positioning a diffuser in a hydraulic power plant having means for directing water through a power generating unit for causing actuation thereof, and supporting means extending downstream of said first mentioned means, the method comprising the steps of: a) Taking a diffuser incorporating a hollow body defined by a lateral wall and having a first open end and a second open end; the opening of said first end being of smaller cross sectional area than the opening of said second end; at least one chamber defined in said wall; and roller means, external to said body and secured to each side thereof; b) Floating the diffuser slightly downstream of said power generating unit and oriented so that the longitudinal axis of said body which extends though said ends, is parallel to the axis of said water directing means of the power plant and positioned substantially thereabove; c) Introducing a liquid into said chamber to cause sinking of said diffuser; d) Directing the sinking diffuser so that said roller means rest on said supporting means; e) Drawing the diffuser along the supporting means to position its first open end against the outlet of said water directing means, and; f) Securing the diffuser in such position.

Although reference in the specification is to a rectilinear frusto-conical diffuser, it will be obvious to those skilled in the art, that the teachings of this invention are independent of the specific shape of the diffuser and that such teachings are also applicable to diffusers of any other shape, such as pyramidal and independently of their rectilinear or elbow shaped configuration.

DESCRIPTION OF THE PREFERRED EMBODIMENT

Figure 1:
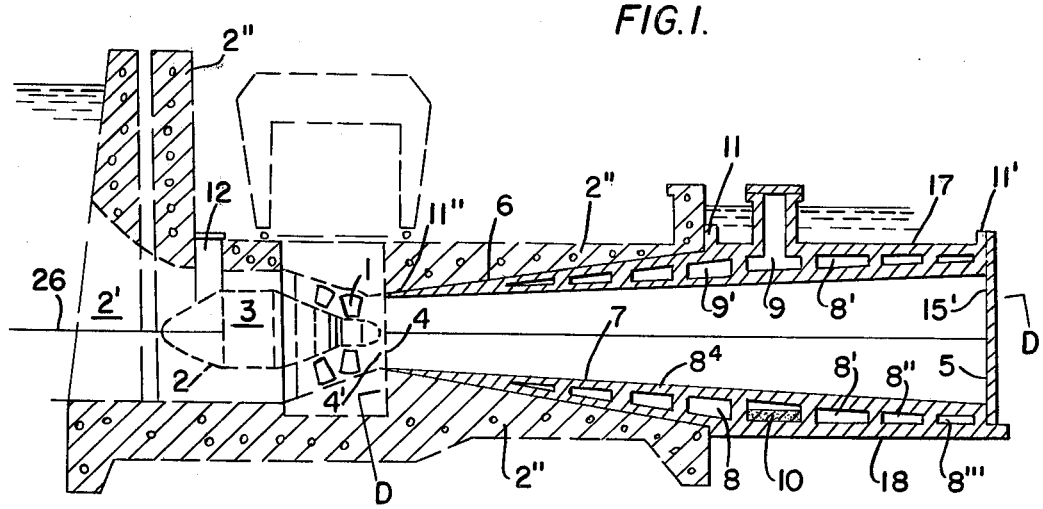
FIG. 1 is a schematic vertical cross section through a hydroelectric power plant incorporating the novel diffuser according to the present invention.

In FIG. 1 there is achematically represented a hydroelectric power plant comprising a dam 2" serving to retain and accumulate a body of water channeled to flow through a conduit 2' leading to a power generating unit 2 positioned therein. In this way the water is directed through the turbine 1 to cause actuation thereof to which effect it comprises conventional turbine rotor 1 and generator 3 as well as the necessary complementary equipment.

The water conduit 2' has a transversal area 4' positioned downstream of said power generating unit 2; and adapted as inlet of the dam primitive diffuser 6 for converting the energy present in the water due to its speed into energy due to pressure thereof.

Dam 2" has an engineered structure cooperating to define the gated water conduit 2' and to support the generation equipment of the hydroelectric power plant.

As is known in the art, access means 12 are provided to enable an operator to approach the hydroelectric power generation set 2 for purposes of inspection, servicing and maintenance. Engineered structure of the dam 2" comprises a concrete diffuser 6 extending downstream from transversal area 4', this primitive and less efficient diffuser will partially house the new, improved diffuser 17, which will be secured thereto by suitable fastening means associated with the flange 11, which cooperates with the engineered downstream face of said dam concrete structure.

Additionally, supporting structures 24 and 24' are arranged downstream of said hydroelectric power plant dam 2"; comprising two vertical support walls one on each side of a central axis 26 extending substantially through the water conduit 2' of the dam, and consequently through power generating unit 3. These supporting walls have two supporting surfaces 22 and 22' extending therefrom toward the vertical plane passing through axis 26.

Figure 3:
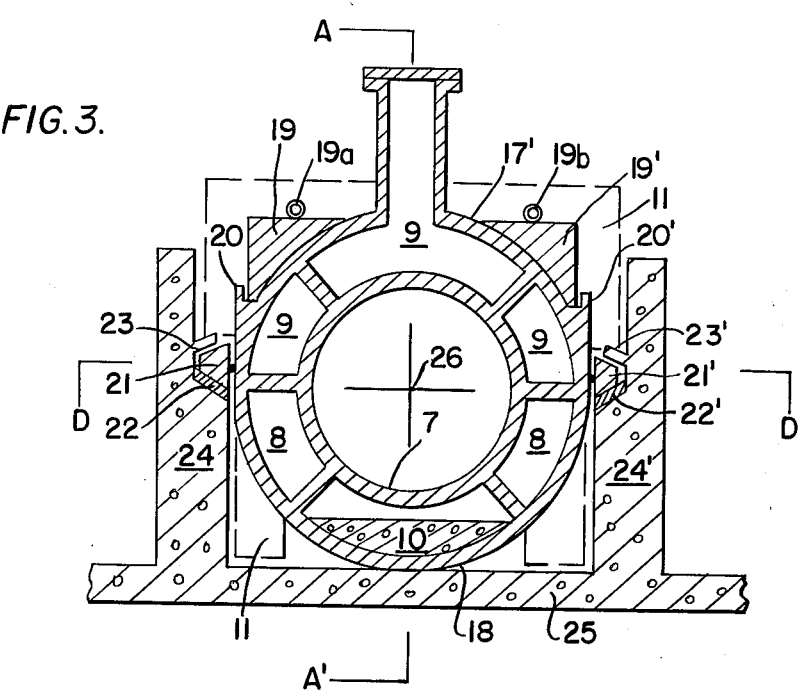
FIG. 3 is a vertical-transversal cross section through said submersible diffuser taken along axis B—B' as seen in the direction of the corresponding arrows shown in FIGS. 2 and 5.
Figure 4:
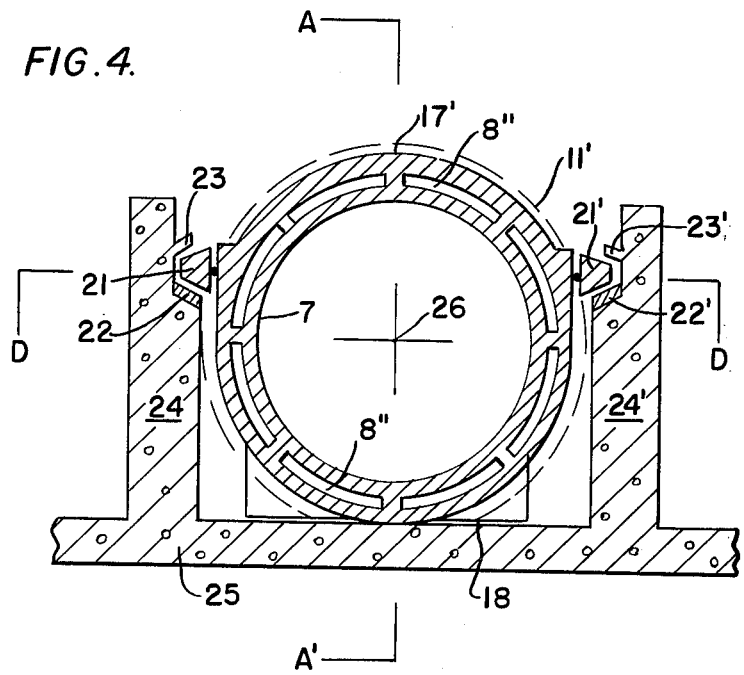
FIG. 4 is a vertical-transversal cross section through said submersible diffuser taken along axis C—C' as seen in the direction of the corresponding arrows shown in FIGS. 2 and 5.
Figure 5:
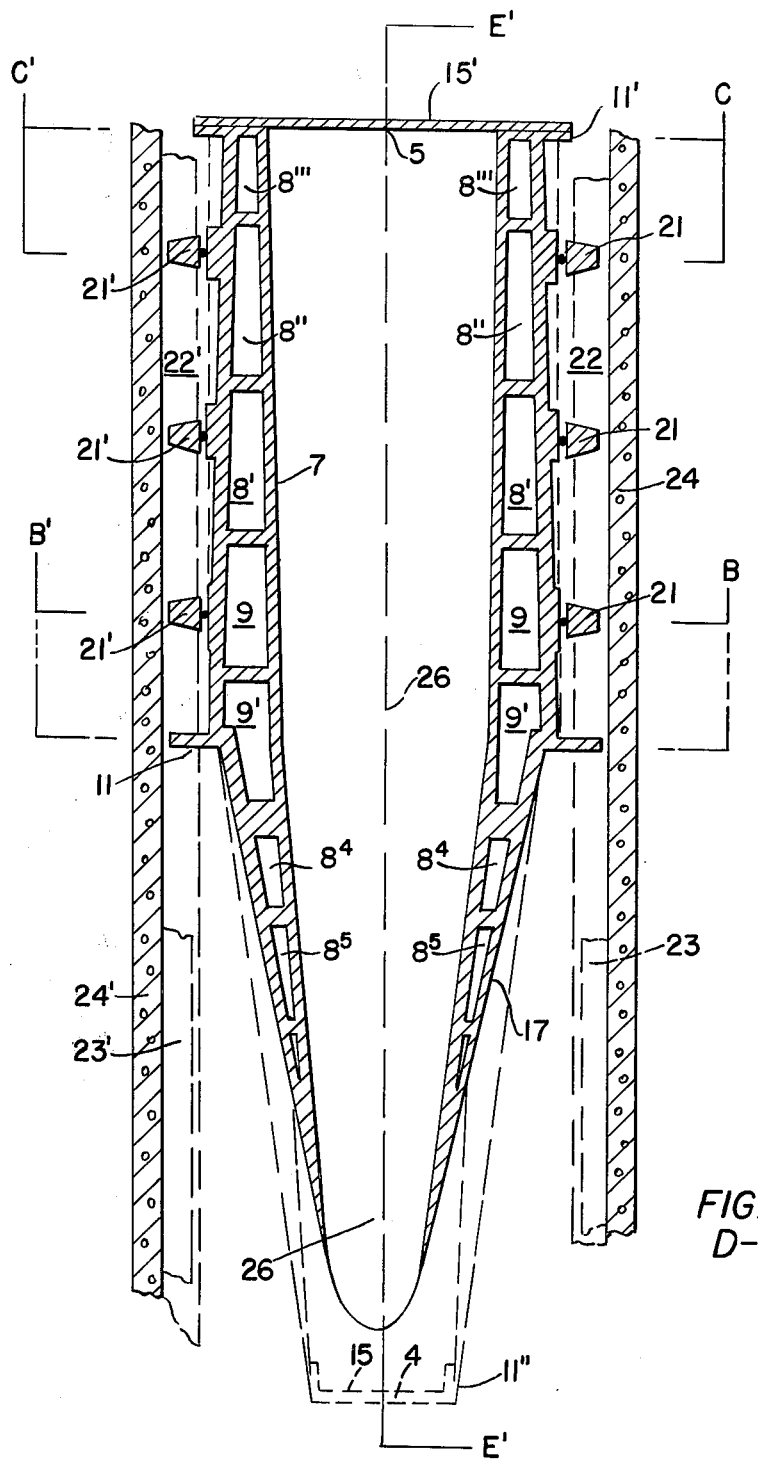
FIG. 5 is a horizontal-longitudinal schematic cross section through the novel diffuser of the present invention and which has been shown in combination with the novel portion, also according to the present invention, of a hydroelectric power plant and related structural dam, following axis D—D of FIGS. 1, 2, 3, and 4.

Supporting surfaces 22 and 22' can either be perpendicular to the vertical walls of supporting structures 24 and 24', or upwardly or downwardly inclined. FIGS. 3 and 4 of the drawings show downwardly inclined surfaces 22 and 22'. Additionally, supporting surfaces 22 and 22' can be longitudinally horizontal or preferably they can be upwardly or downwardly inclined. FIGS. 3, 4, and 5 of the drawings show upwardly longitudinal inclined surfaces 22 and 22', as going away from the main body 2" of the dam.

Spaced from and above the portion of supporting surfaces 22 and 22' which is closest to the hydroelectric power plant dam body 2", are guide rails 23 and 23' for the purpose to be described further on.

Figure 2:
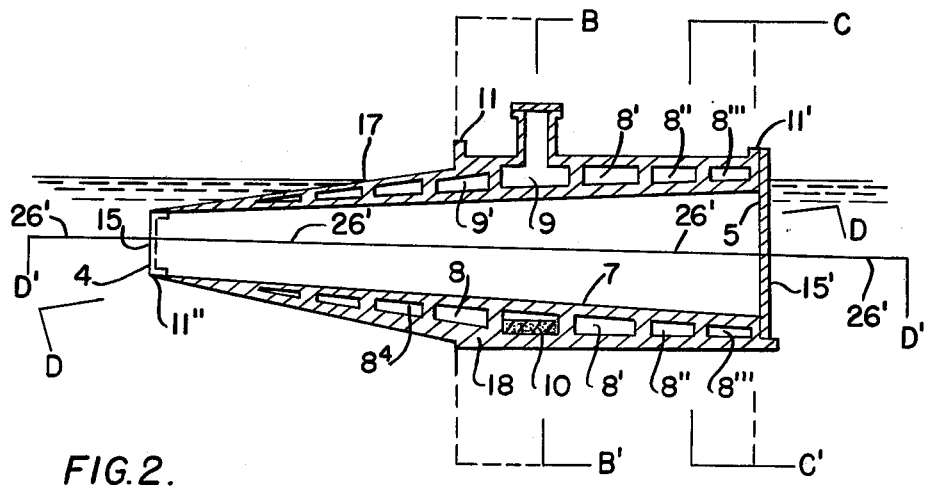
FIG. 2 is a vertical cross section taken along axis E'—E' as seen in the direction of the corresponding arrows shown in FIG. 5, of said submersible diffuser.

Referring again to FIGS. 1 and 2, the diffuser 17 of the present invention will now be described. This diffuser 17 comprises a hollow body of frusto conical configuration defined by a lateral or peripheral wall 7, and has a first open end 4 adapted to be positioned against the transversal area 4' of the dam water conduit 2' for receiving the water emerging therefrom.

To this effect, a portion of the novel diffuser 17 is positioned within the funnel shaped structure 6 engineered as the primitive diffuser of dam 2". Likewise, diffuser 17 has a second open end 5 for discharging the water which is fed into the diffuser 17 through its first end 4.

As is known in the art, the surface of the opening of first end 4 has a smaller area than the surface of the opening of the second end 5. Also, the longitudinal distance between first end 4 and second end 5 is preferably around 10 times the diameter of first open end, to 15 times said diameter; as in this way maximum hydraulic efficiency of hydroelectric power plant is obtained.

Lateral wall 7 has a plurality of chambers 8, 8', 8" .. . 9, 9', 9" . . . ; 10, 10', 10" . . . defined therein and surrounding the hollow body of diffuser 17. These chambers 8, 8', 8"; etc. are preferably positioned one beside another and extend substantially from the first end 4 to the second end 5 as well as annularly around the lateral wall 7. While chambers 9, 9', 9" . . . are preferably service chambers for housing auxiliary equipments and machines such as: air compression systems, power generation facilities, and so on; the chambers 8, 8', 8" . . . instead, are intended to be filled with liquid to cause sinking of said submersible diffuser 17, or with gas such as air to cause floatation thereof as will be further described when reference is made to the method of positioning and mounting the diffuser.

Chambers 10, 10', 10" . . . ; are mainly for internal ballasting purposes, for stabilizing floatation of the diffuser 17, when in navigation.

Although a single chamber replacing chambers 8, 8', 8" . . . is adequate for the objetives of the present invention, it is preferable to provide a plurality of individual chambers as shown in the drawings.

A single chamber is made by simply closing the first end and the second end of the hollow body defined by wall 7 of said diffuser, by means of covers 15 and 15' fitted against flanges 11" and 11' defined around the first open end and the second open end of said diffuser.

All these individual chambers 8, 8', 8" . . . are connected to a main duct for purposes of fluid displacement by admission into them of pressurized gas or air for floatation purposes of said diffuser.

Similarly, inlets for liquid admission and outlets for liquid exhaustion are provided in coincidence with chambers 8, 8', 8" . . . ; as is well known in the art.

The volume of the chambers defined in lateral wall 7 and adapted to be filled with fluid, is at least sufficient to cause sinking of said diffuser 17 in any desired controlled position when they are filled with liquid or water.

Likewise, the volume of chambers 8, 8', 8" . . . is also at least sufficient to cause floatation in any desired controlled position of diffuser 17, when they are filled with gas, or compressed air.

Another mean for purposes of sinking or floatation of diffuser 17, is by means of the incorporable or removable external ballasts weights 19, 19'; moved by cranes engageable with the hoops 19(a), 19'(b); and lodged on recesses 20, 20' defined in structural wall 17' of said diffuser as shown in FIG. 3.

Diffuser 17 further comprises a first set of rollers 21; and a second set of rollers 21'; mounted one set on each side of diffuser 17. Each one of these rollers is rotatable around an axis secured to lateral wall 17' as shown in FIGS. 3, 4 and 5.

Rollers 21, 21'; are arranged in a single plane and serve to movably support the diffuser on supporting surfaces 22 and 22', thus permitting diffuser 17 to be moved towards and away from said hydroelectric power plant 2" during mounting or dismounting thereof, respectively.

To submerge and position diffuser 17 in the hydroelectric power plant, the diffuser 17 is caused to float with its first end 4 slightly downstream of the outlet of the power generating station and oriented so that its longitudinal axis 26' is parallel and substantially above the longitudinal axis 26 of power generation hydroelectric unit 3.

Obviously, to assure floatation of the diffuser the chambers 8, 8', 8" . . . , must be filled with pressurized gas or pressurized air.

Once the diffuser is in the already described position, said pressurized gas or air is exhausted from the chambers to cause sinking of the diffuser. During the sinking procedure, displacement of submerging diffuser 17 is directed or guided so that rollers 21, 21', are made to rest on supporting surfaces 22, 22'.

Once this process is completed, the submerged diffuser is drawn towards the power generating unit 3 in such a way that the first open end 4 is placed in coincidence with transversal area 4'. Once this position has been attained, diffuser 17 is secured in position by fastening flanges 11 against dam body 2"; or by mean of the weight component parallelling the roller displacement.

It will be seen that once the submerging diffuser 17 approaches the hydroelectric power plant 2", rollers 21, 21' are positioned between supporting surfaces 22 and guide rail 23 and supporting surface 22' and guide rail 23', respectively; whereby guide rails 23 and 23' cooperate in assuring the correct alignment of the submerging diffuser and thus maintain the rollers 21, 21' in contact with supporting surfaces 22 and 22', respectively.

According to the present invention it is possible to adapt a conventional hydroelectric power plant to receive the novel diffuser by the addition to the former of the already described supporting surfaces 22, 22' and their associated structures.

Once the submerged diffuser 17 is secured into its resting position, the bottom face 18 will be substantially coplanar with the tailwater engineered structure of the dam 25.

It will be understood that improvements or modifications may be introduced in the embodiment described by way of example without departing from the scope of the invention specifically defined in the following claims.

I claim:

1. A method of submerging and positioning a diffuser in a hydraulic power plant having means for directing water through a power generating unit for causing actuation thereof and supporting means extending downstream of said water directing means, the method comprising the steps of: a) taking a diffuser incorporating a hollow body defined by a lateral wall and having a first open end and a second open end; the opening of said first end being of smaller cross sectional area than the opening of said second end; at least one chamber defined in said wall; and roller means, external to said body and secured to each side thereof; b) floating the diffuser slightly downstream of said power generating unit and oriented so that the longitudinal axis of said body and which extends through said ends, is substantially parallel to the axis of said water directing means of the power plant and positioned substantially thereabove; c) introducing water into said chamber to cause sinking of said diffuser; d) directing the sinking diffuser so that said roller means rest on said supporting means; e) drawing the diffuser along the supporting means to position its first open end coincidentally against the outlet of said power plant water directing means; and f) securing the diffuser in such position.

2. In a hydroelectric power plant having means for directing water through a power generation unit for causing actuation thereof; the improvement comprising a diffuser incorporating a hollow body defined by a lateral wall, such body having a first open end positioned against the outlet of said dam water directing means for receiving the water emerging therefrom, and a second open end for discharging the water entering said first end; the opening of said first end of smaller cross sectional area than the opening of said second end; at least one chamber defined in said diffuser body wall and having a volume at least sufficient to cause sinking or flotation of said diffuser when said chamber is filled with liquid or gas, respectively; means for filling said chamber with liquid for sinking purposes or with gas for flotation purposes; means for movably supporting said diffuser downstream of said power hydroelectric plant; said supporting means including two sets of substantially coplanar rollers mounted one set on each side of said hollow body; and two supporting surfaces positioned downstream of said power plant so that said rollers can be made to rest on said surfaces and rolled therealong towards and away from said power plant during mounting or dismounting of said diffuser, respectively.

3. The hydroelectric power plant as claimed in claim 2, including means for securing said diffuser in a position with said first open end coincidentally positioned against the outlet of said water directing means.

4. The hydroelectric power plant as claimed in claim 2, including, guide rails disposed above the portion of said supporting surfaces closest to said dam water outlet to maintain said rollers in contact with said supporting surfaces whereby, during installation the approaching diffuser maintains alignment with said outlet of said dam water directing means.

5. Submersible diffuser as claimed in claim 2, further comprising a plurality of said chambers arranged to cause sinking of said diffuser in any desired controlled position when said chambers are filled with fluid; or floatation in any desired controlled position when said chambers are filled with gas.

6. Submersible diffuser as claimed in claim 2, wherein the distance between said first and second open ends is between 10 to 15 times the diameter of said first open end.

7. In the hydroelectric power plant claimed in claim 2, wherein, said two supporting surfaces are inclined towards said outlet of said water directing means.

* * * * *